June 30, 1959 G. H. SCHURGER ET AL 2,892,389
FEED REEL MECHANISM FOR MACHINE TOOLS
Filed Jan. 28, 1955 9 Sheets-Sheet 1

Inventors,
Garner H. Schurger
Maurice P. Morgare
Carlson, Pitzner, Hubbard & Wolfe
Attorneys

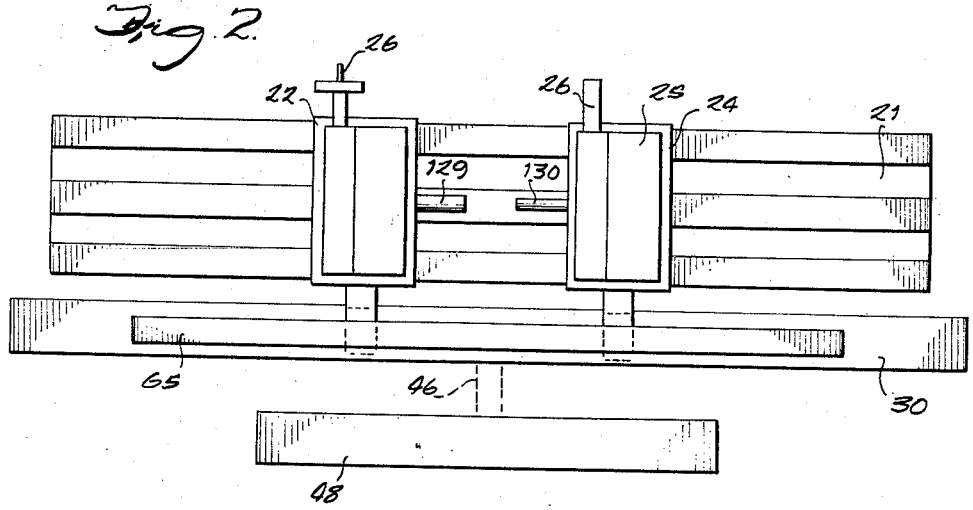
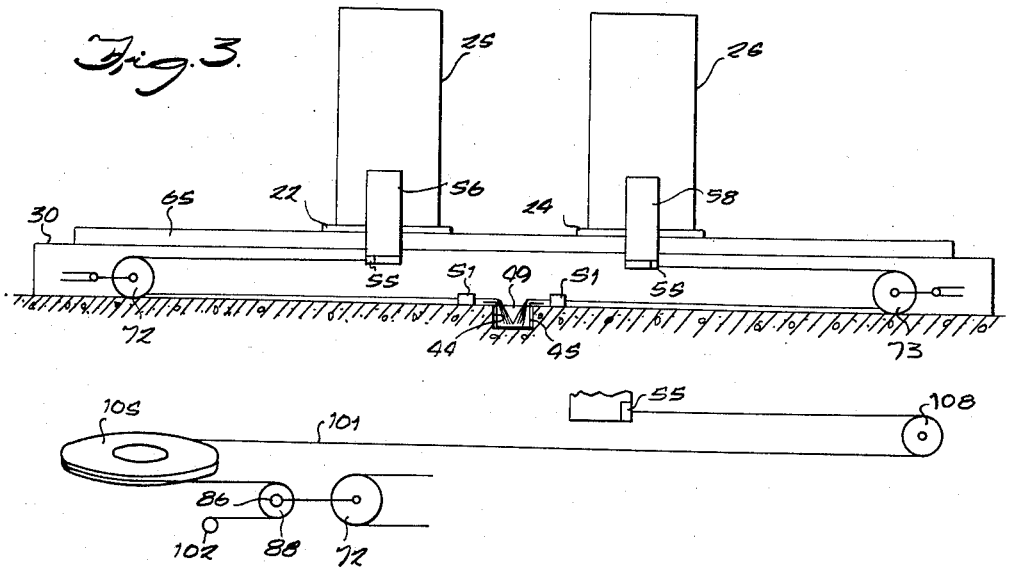

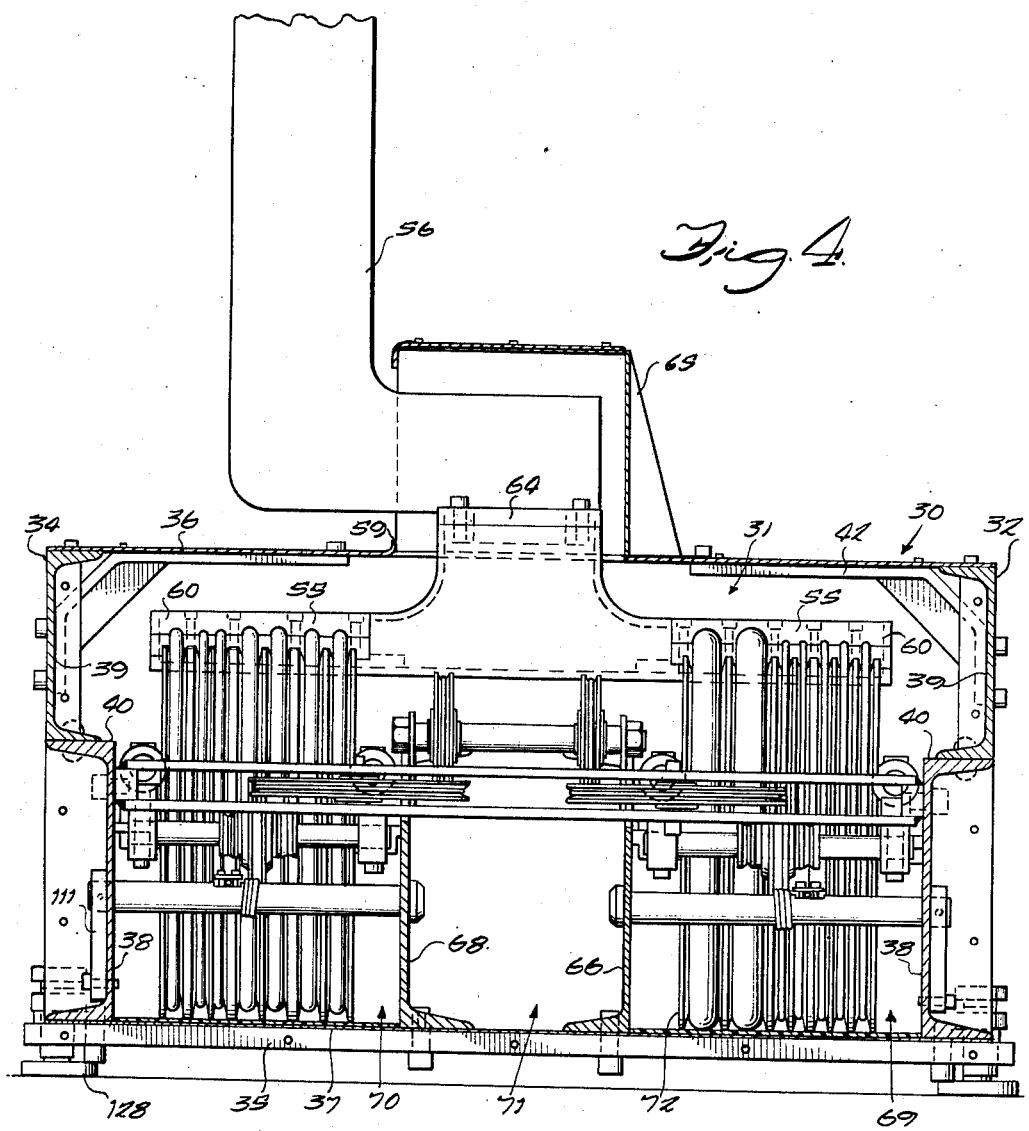

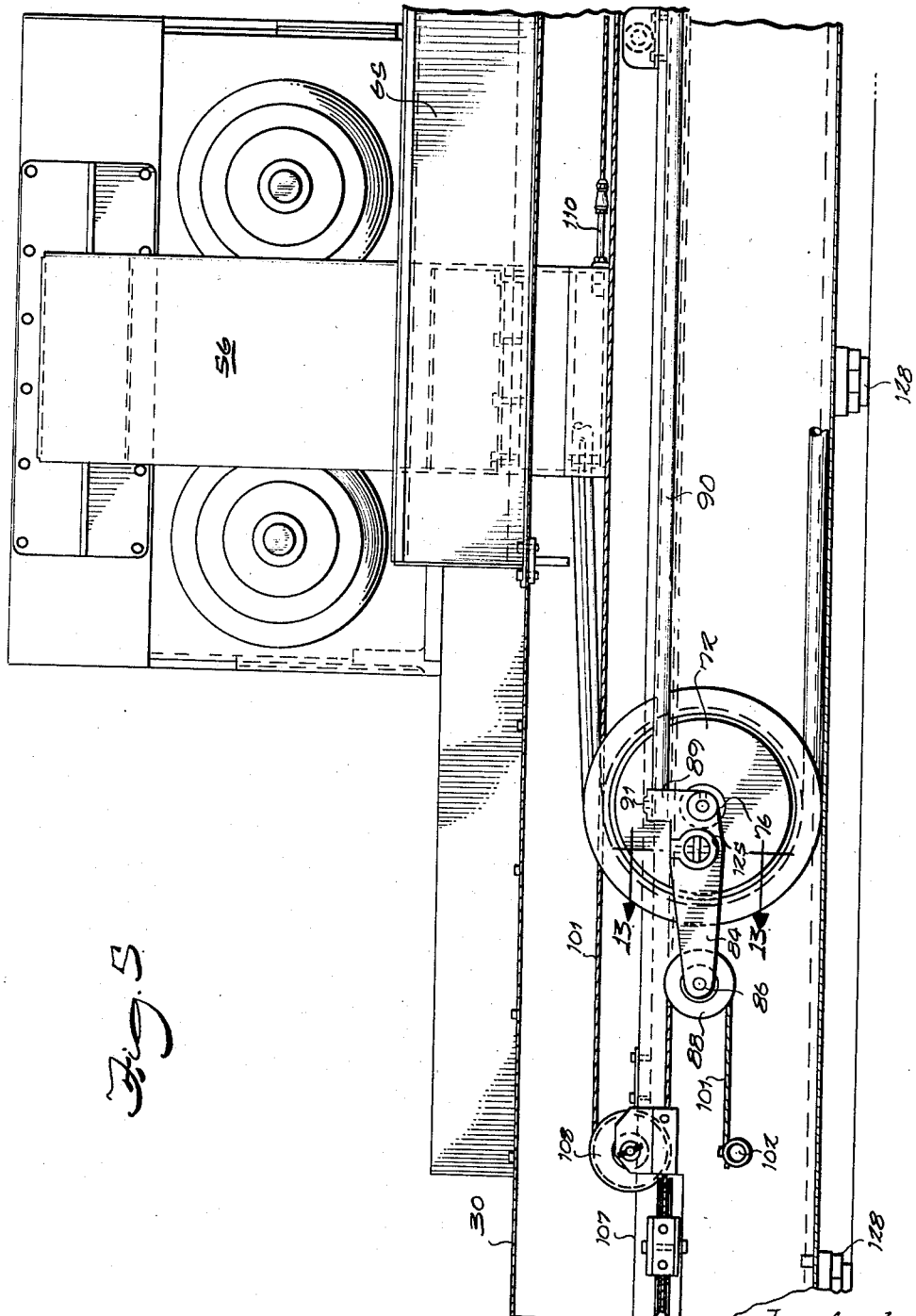

June 30, 1959 G. H. SCHURGER ET AL 2,892,389
FEED REEL MECHANISM FOR MACHINE TOOLS
Filed Jan. 28, 1955
9 Sheets-Sheet 5
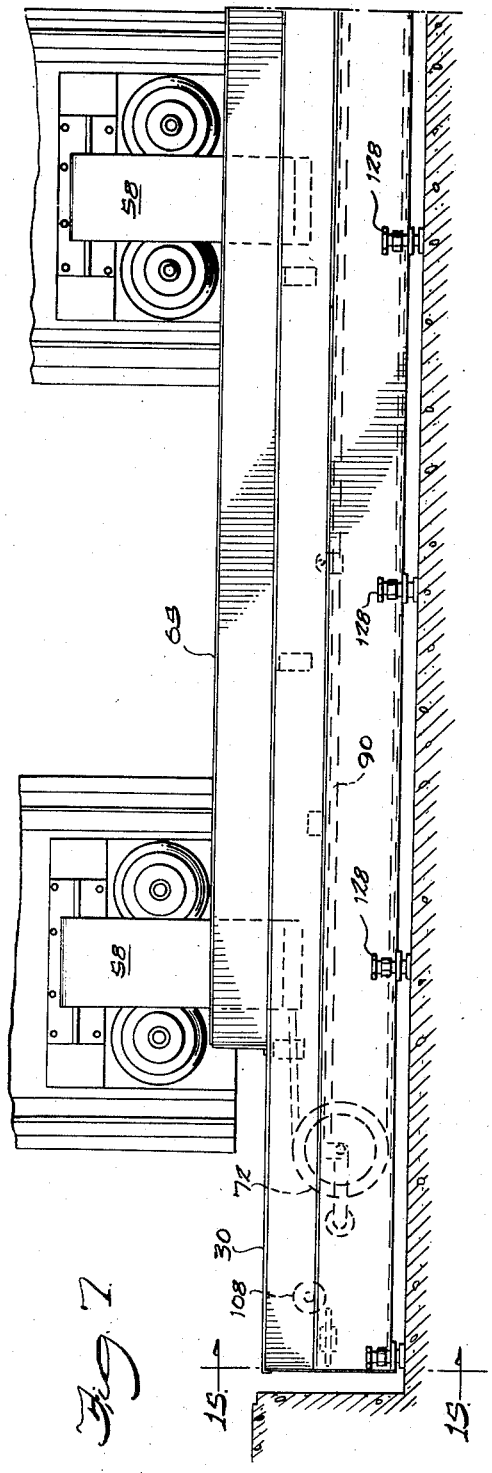
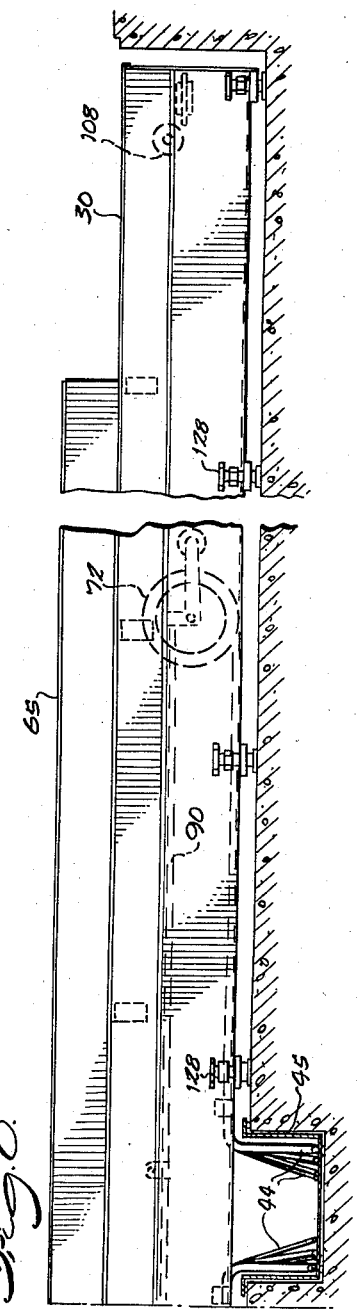
Inventors
Garner H. Schurger
Maurice P. Morgan
Carlson, Pitzner, Hubbard & Wolfe
Attorneys

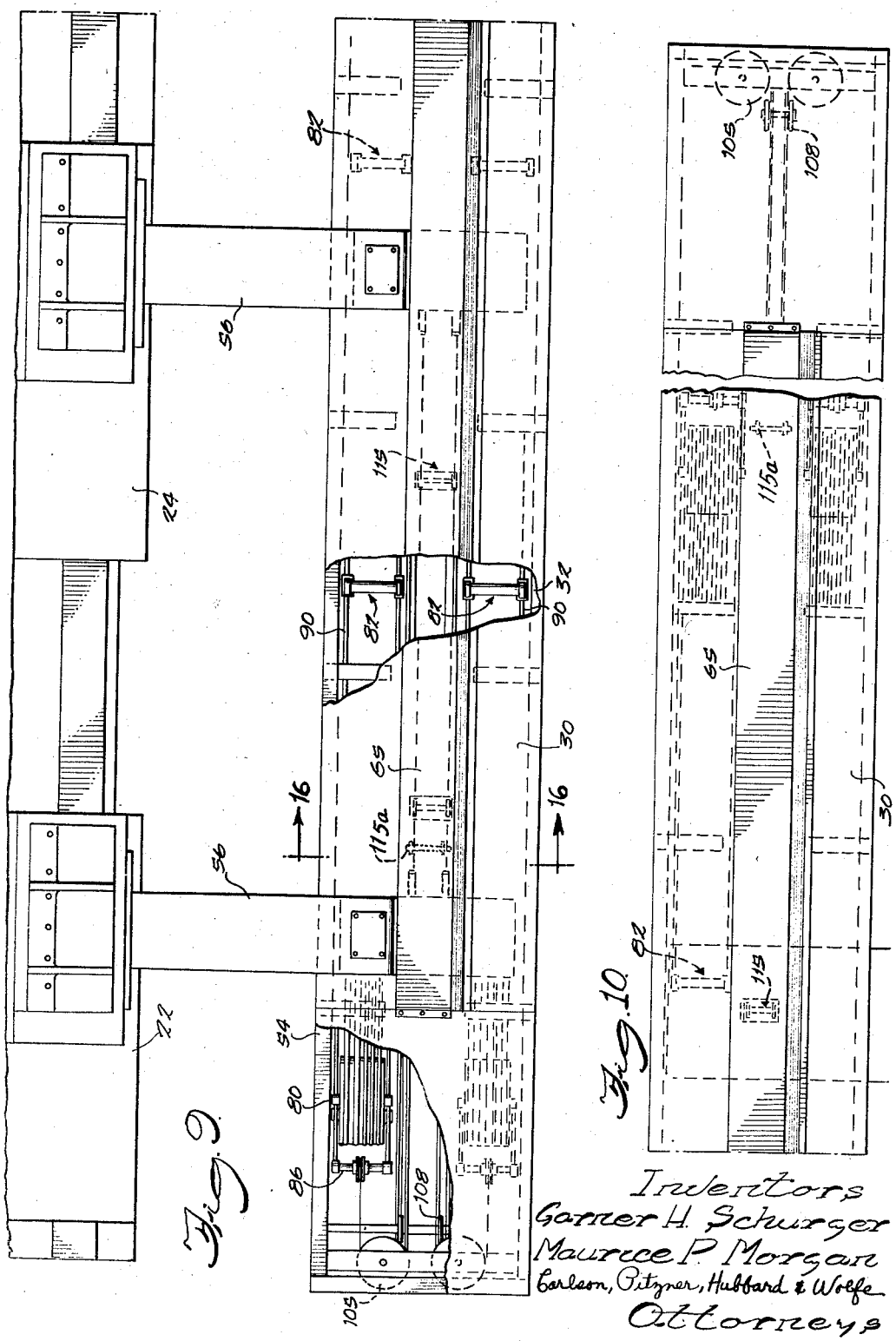

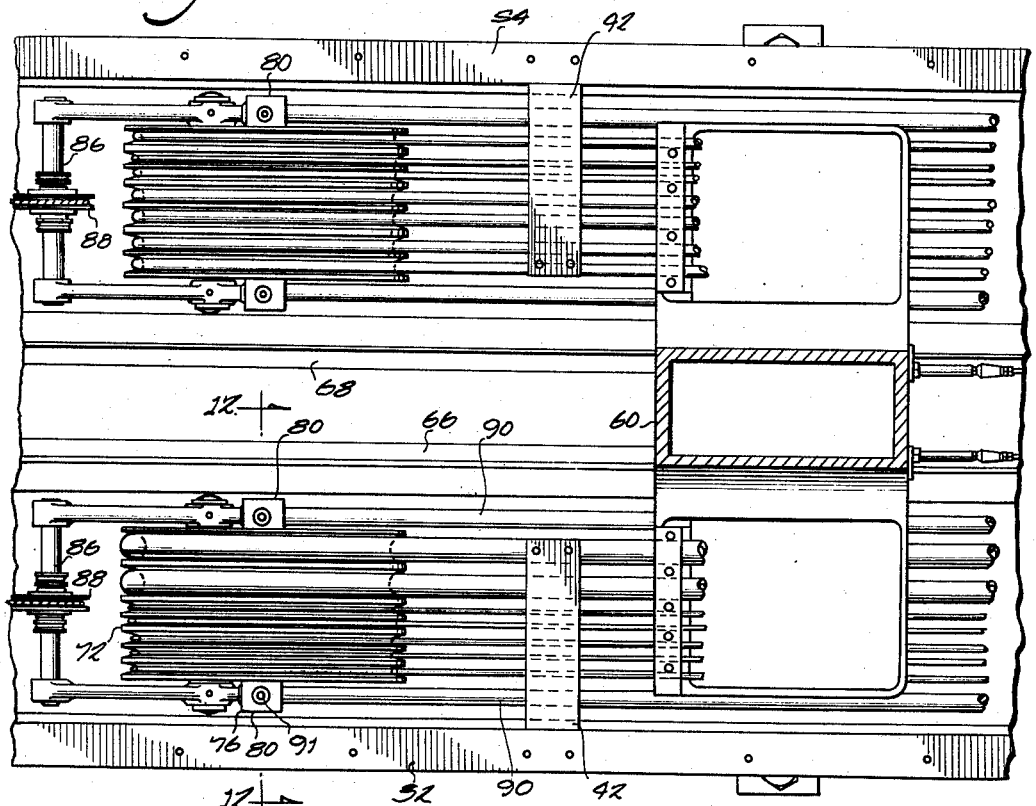

June 30, 1959  G. H. SCHURGER ET AL  2,892,389
FEED REEL MECHANISM FOR MACHINE TOOLS
Filed Jan. 28, 1955  9 Sheets-Sheet 8
Fig. 12.
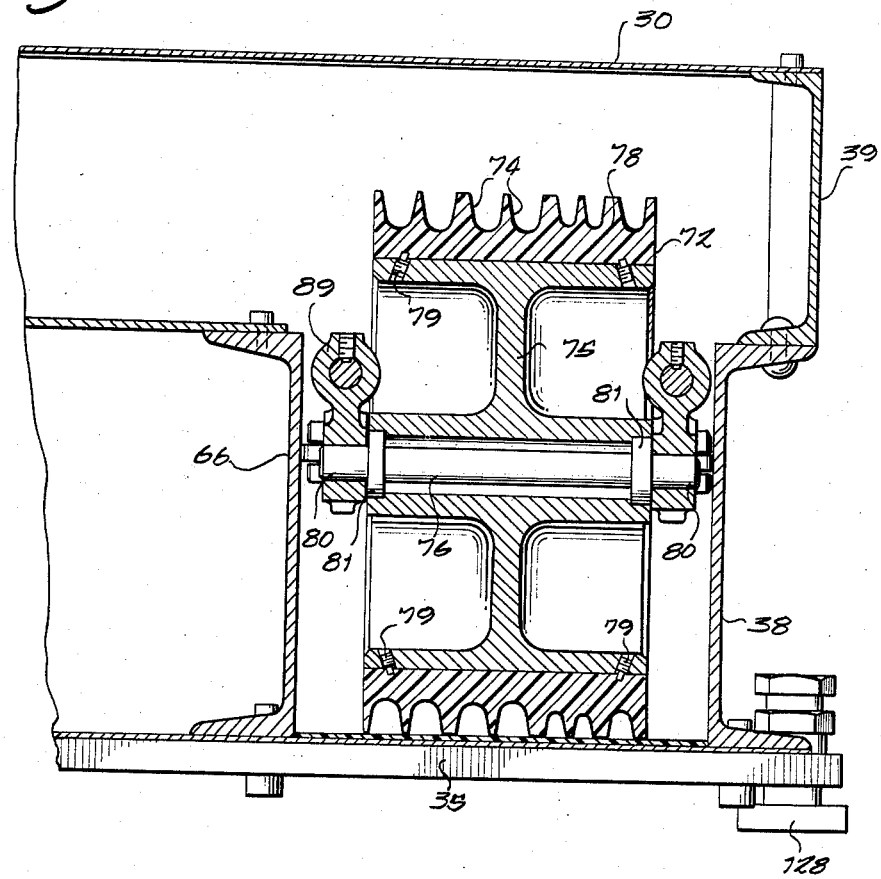
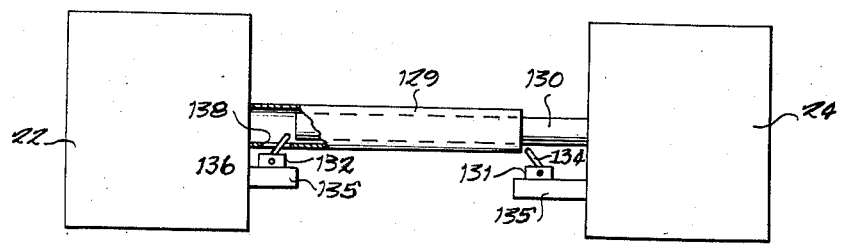
Fig. 17.
Inventors
Garner H. Schurger
Maurice P. Morgan
Carlson, Pitzner, Hubbard & Wolfe
Attorneys

United States Patent Office 2,892,389
Patented June 30, 1959

2,892,389
FEED REEL MECHANISM FOR MACHINE TOOLS

Garner H. Schurger and Maurice P. Morgan, Fond du Lac, Wis., assignors to Giddings & Lewis Machine Tool Company, Fond du Lac, Wis., a corporation of Wisconsin Application January 28, 1955, Serial No. 484,722

7 Claims. (Cl. 90—15)

The present invention relates generally to machine tools having translatable members such as saddles, carriages or the like, and more particularly to an improved service feed mechanism for leading power and control connections to the translatable members.

One object of the invention is to provide means within a single compartment for tensioning, shielding and otherwise protecting flexible conduits utilized to supply power to or to establish control connections with a plurality of translatable machine tool members, each having a relatively long range of travel over a common path.

A more specific object is to provide a doubled up arrangement of winding reels within a single feed reel compartment, one in each end of the compartment and alined longitudinally with respect to the same for protecting flexible power and control conduits to two machine tool saddles traversable in series along one bed, the compartment being substantially the same length as the length of the bed and yet each reel being operative to permit travel by its corresponding saddle over virtually the full length of the bed.

Another object is to provide a feed reel mechanism of the character set forth which mechanism includes a plurality of guide rollers arranged in tandem with the feed reel and spaced laterally thereof for supporting a long bight of conduit and thereby preventing undue strain and sag of the conduit.

A still further object of the invention is to provide a feed reel mechanism for servicing with power and utilities two translatable machine tool units, which mechanism is disposed within a single reel compartment and yet may be split up between two longitudinal portions of the compartment for shielding sensitive electrical control circuits from main power circuits.

Still another object of the invention is to provide a feed reel mechanism for servicing a pair of machine tool carriages, which mechanism is embodied in a single compact feed reel compartment easily fabricated and assembled, and which, when assembled, constitutes a complete, closed unit construction which is adaptable to be supported independently from the machine itself.

It is an ancillary object of the invention to provide a novel stop mechanism for use with a plurality of machine tool members traversable in series along a common support path, which mechanism cuts off the translatory movement of such members toward each other upon the attainment of a predetermined degree of proximity.

Further objects and advantages will become apparent as the following description proceeds, taken in connection with the accompanying drawings, wherein:

Fig. 2 is a diagrammatic plan view showing the feed reel mechanism as interposed between a machine tool and a power supply panel.

Fig. 3 is a diagrammatic longitudinal section taken through the feed reel mechanism and showing the relation of the feed reels with respect to their respective machine tool saddles.

Fig. 4 is an enlarged vertical section taken transversely through the mechanism.

Fig. 5 is an enlarged fragmentary longitudinal section taken through the mechanism.

Fig. 6 is a diagrammatic view showing the layout of the tensioning arrangement for one reel device.

Figs. 7 and 8 are fragmentary elevation views taken over the full length of the mechanism and showing the relative positions of one set of reel devices when the two machine tool saddles are near one end of the machine tool bed.

Figs. 9 and 10 are fragmentary plan views corresponding to Figs. 7 and 8, respectively.

Fig. 11 is a fragmentary plan view of Fig. 4 with the cover plates removed and when one of the machine tool saddles is near the end of the machine tool bed.

Fig. 12 is a vertical section taken along the line 12—12 in Fig. 11 showing a cutaway view of an illustrative feed reel.

Fig. 13 is a further enlarged transverse sectional view detailing one of the conduit support rollers of a reel device.

Fig. 14 is an enlarged detail view showing the reel guide roller assembly.

Fig. 17 is a diagrammatic elevational view showing details of the safety stop mechanism.

Figure 1:
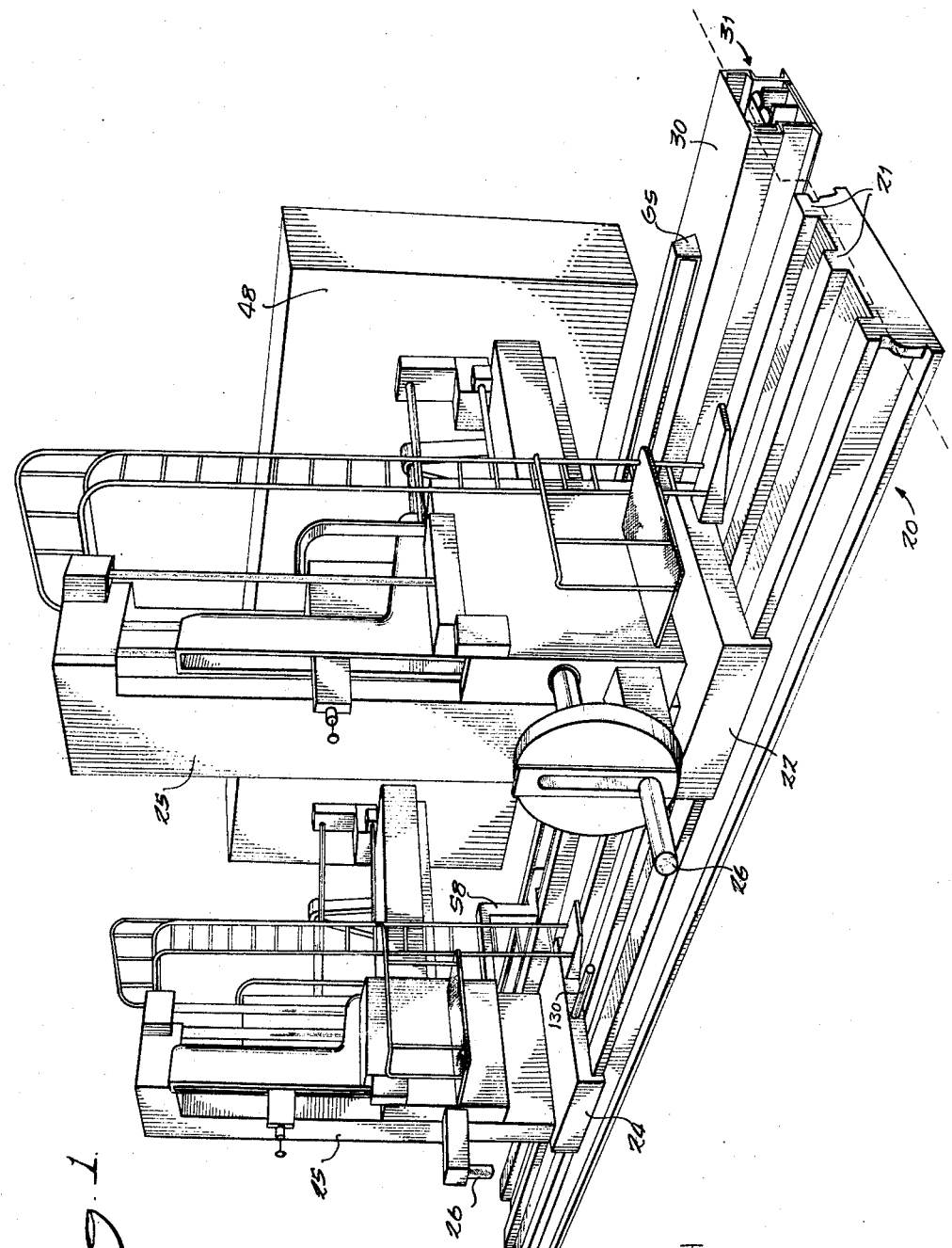
Figure 1 is a perspective view of an illustrative feed reel mechanism embodying the invention, such view showing the mechanism as associated with a machine tool having two saddles or carriages mounted for translational movement along common guideways.

While the invention is susceptible of various modifications and alternative constructions, an illustrative embodiment has been shown in the drawings and will be described below in considerable detail. It should be understood, however, that there is no intention to limit the invention to the specific form disclosed, but on the contrary, the intention is to cover all modifications, alternative constructions, and equivalents falling within the spirit and scope of the invention as expressed in the appended claims.

Referring to Fig. 1 of the drawings, the machine selected to illustrate the invention comprises an elongated base or bed 20 having horizontally disposed ways 21 on its upper face for slidably supporting a pair of translatable saddles or carriages 22, 24. Each saddle carries a headstock column 25 thereon for mounting a tool 26. The invention is particularly suitable for use with large machine tools, such as horizontal boring, drilling and milling machines, and has been shown herein as embodied in a machine of that type for purposes of illustration.

The translatable saddles and columns of such machine tools are usually equipped with driving motors, limit switches and other controls which require service connections with remotely situated power and control sources. When electrical controls and motors are employed, the connections are usually provided by electrical conductors which, for protection, are enclosed in flexible conduits. It will be appreciated that flexible conduits may also be used for other purposes, such as supplying pressure fluid to hydraulic mechanism on the movable machine elements, and consequently the term "conduit" as used hereinafter is intended to embrace any connecting means of the general type described.

In machines where the translatable members are movable over relatively long paths, the problem of handling the flexible service connections to the translatable members becomes rather acute. This is particularly true where the translatable members have overlapping or common paths of movement. Provision is made in the illustrative machine described herein for overcoming such problem in an eminently satisfactory manner. This involves the use of a housing 30 external to and extending longitudinally of the machine bed 20, which housing defines a feed reel compartment 31 having a length approximating that of the bed. As shown in Fig. 4, the housing 30 is preferably constructed using longitudinal structural metal channel beams for the front and back walls 32, 34, respectively, a flat metal sheet for the bottom plate 35, and pieces of relatively thin gauge sheet metal or the like for the cover plates 36. A relatively thin sheet 37 of suitable insulating material, such as Masonite, is placed on top of the bottom plate 35 to prevent grounding of the electrical wires due to an inadvertent break in the flexible conduits.

Each of the front and back walls 32, 34, comprises an outwardly facing channel beam 38 having one flange suitably fastened to a longitudinal edge of the bottom plate 35 and a smaller channel beam 39 facing inwardly and held rigidly on top of the beam 38 by suitable connectors, such as rivets. The channel beams 38 and 39 are so alined that the web of the smaller upper beam 39 is substantially flush vertically with the outer flange ends of the larger supporting beam 38 with the result that a square inner shoulder 40 is formed on the uppermost corner of the lower beam 38, the purpose of which will be more fully described later. The members forming the walls are bolted or otherwise fastened together to form a boxlike structure, generally rectangular in cross-section, and in this instance open at the ends.

For the purpose of supporting the cover plates 36 over the compartment 31, a plurality of L-shaped brackets 42 are suitably fastened at one end to the inside of the web of each of the upper channel beams 39 at various points spaced longitudinally along the housing 30 with provision for bolting the other ends of the brackets to the underside of the plates 36.

It will be observed from Fig. 8 that, in the illustrative embodiment, the housing 30 is recessed into the floor so that the cover plates 36 are substantially level with the floor and serve as floor plates. This arrangement is especially advantageous where floor space is at a premium.

As shown in Fig. 8 and diagrammatically in Fig. 3, within the housing 30 a series of conduits 44, some of which enclose a plurality of electrical conductors, extend from a junction box 45 to the saddles 22, 24. Attention is drawn to the arrangement of the junction box 45 intermediate the ends of the housing 30 so that the conduits 44 are led in opposite directions to each of the saddles 22, 24. In this instance, the box 45 is disposed below the bottom plate 35 of the housing and is received in one end of a wire carrying duct 46 recessed in the floor. Upon reference to Figs. 1 and 2, it will be seen that a conventional power control panel 48 is provided exterior to the housing 30 and connected thereto by means of the duct 46. In the illustrative embodiment, the wire carrying duct 46 carries the source of current and other power from the control panel 48 to the junction box 45. Connections are then made in the junction box 45 between the source of current and the conductors of the conduits 44. A central opening 49 in the bottom plate communicates between the compartment 31 and one end of the duct 46 to accommodate passage of the conduits from the duct to the feed reel assembly.

Figure 16:
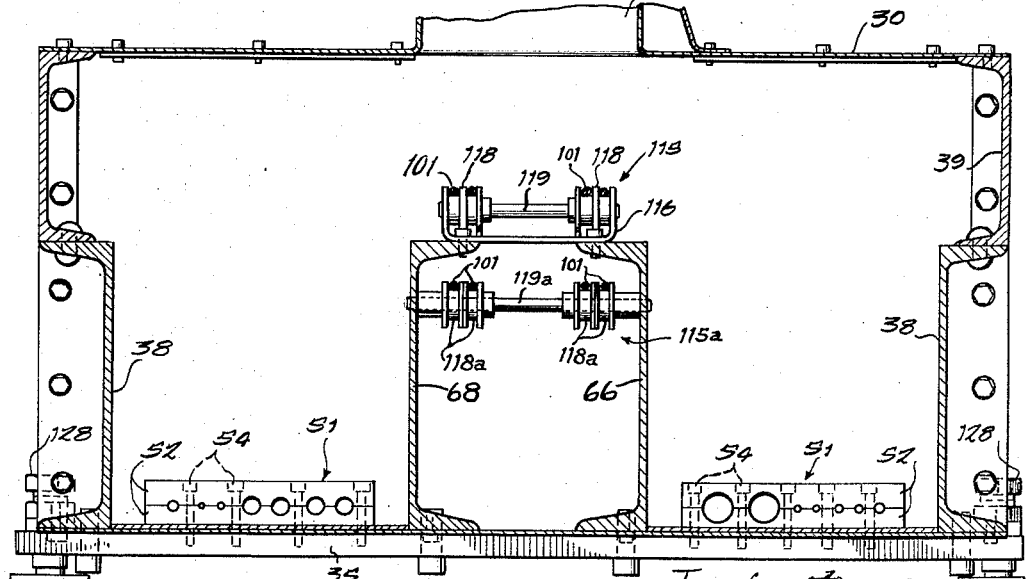
Fig. 16 is an enlarged fragmentary vertical sectional view taken transversely through the mechanism along the line 16—16 in Fig. 9 and showing certain details of the conduit clamps and tensioning arrangement.

Each of the conduits 44 is suitably anchored to the bottom plate 35 of the housing 30 adjacent to and on either side of the junction box 45 by a clamp 51, as shown in Figs. 3 and 16. The conduit clamps 51 are of heavy duty construction having split halves 52, both of which are secured to the bottom plate 35 by machine screws 54. The conduits 44 are anchored at their other ends to brackets 55 secured to hollow overhanging side portions or arms 56, 58 of the saddles 22 and 24, respectively.

Upon an inspection of Figs. 4 and 11, it will be seen that the arms 56, 58 secured to the saddles 22, 24 are formed in an upright Z-shape and the feed reel housing 30 is so arranged with respect to the machine tool that the outer lower ends of the arms are movable above the longitudinal central portion of the housing in accordance with translation of the carriages. A central longitudinal opening 59 in the housing 30 is defined by the cover plates 36 and provides means for communication between the outer ends of the arms 56, 58 and the interior of the housing or feed reel compartment 31. Depending from the end of each of the arms 56, 58 is a tray 60 which is embodied in a generally flat, rectangular configuration and extends transversely within the upper portion of the compartment 31. The flat tray 60 has a substantially open top and includes a hollow vertical stem portion 61 having a flange 62 at its upper end for bolting to a mating flange 64 on the end of each arm 56, 58. Affixed to the open top of the tray 60 is the bracket 55 which is of heavy duty construction similar to the clamp 51 which has been previously described. Thus, it is seen that in operation, the tray 60 is rigidly secured to each of the arms 56, 58 so that each tray and arm move as a unit. The conduits 44 are led from the bracket 55 across the top of the tray and upwardly through the hollow stem portion 61 and thence through the hollow arm 56 or 58 and to the motors and other power or control elements on the respective saddle or column in any convenient manner. For the purpose of protecting the conduits 44 from mechanical injury and to shield the feed reel compartment 31 from oil and dirt, a longitudinal sheet metal hood 65 extending nearly the full length of the housing 30 and having one open side for accommodation of the arms 56, 58 is secured to the cover plate 36.

In the illustrative embodiment of the present invention the feed reel compartment 31 is divided by separator member 66, 68 into a pair of longitudinal alleyways 69, 70, separated by a central passage 71. In the present instance, the dividing members are formed from structural metal channel beams which are each fastened through one flange to the bottom plate 35 by means of machine screws or the like. This division of the compartment 31 into separate longitudinal alleys is found to be especially advantageous where a sensitive electrical control circuit must be shielded or isolated from the main power circuit. The conduits carrying the sensitive control circuits may be disposed in one alleyway, while the conduits carrying the main power cricuits may be disposed in the other alleyway, the central passage 71 thus shielding or isolating the respective circuits.

As shown in the drawings, the front alley 69 houses the conduits carrying the main power cricuit and the rear alley 70 contains the conduits carrying the sensitive electrical control circuit. This separation of the aforementioned circuits is, however, a matter that is determined by the specific requirements of a particular installation. In other circumstances, no such separation might be necessary and in such event there would be but one alley and one set of feed rolls, rather than the two sets shown in the illustrative embodiment. Accordingly, the following explanation of the device will be directed toward the feed reel mechanism contained in one alley only, the front alley 69, it being understood that the rear alley 70 is substantially identical thereto in all structural and functional respects.

In accordance with the present invention, service conduits are led to a pair of machine tool saddles translatable along a common overlapping path and such conduits are at all times maintained taut by means including a corresponding pair of feed reels disposed for longitudinal movement along a common overlapping path in the feed reel housing. Referring more specifically to the drawings, and especially to Fig. 3, this means comprises a pair of reels or sheaves 72 and 73 each having a plurality of relatively deep peripheral grooves 74 over which the conduits 44, leading to the saddles 22 and 24, respectively, are run. The sheaves 72 and 73 are generally oppositely disposed in the alley 69 and are arranged so that the sheave 72 moves in obedience to the saddle 22 and the sheave 73 is similarly operatively associated with the saddle 24. Each sheave is freely supported for rolling movement within the elongated alley 69 and is guided between the vertically disposed web of the channel beam 38 associated with the front wall and the similarly disposed web of the channel beam type dividing member 66. As each saddle moves away from its respective end of the bed 20, the conduits 44 running over the corresponding sheave pull it along in the direction of travel of the saddle.

Having observed the general arrangement of the sheaves 72, 73 within the housing, attention may now be given to the details of such sheaves. Referring particularly to Fig. 12, one of such sheaves preferably comprises a cylindrical metallic core piece 75 apertured centrally to receive an axle 76, and a peripheral ring 78 of insulating material, such as a plastic of the phenolic type, which ring contains the conduit grooves 74. This outer ring 78 is held fast to the core piece 75 by means of a plurality of peripherally spaced set screws 79. The ends 80 of the axle 76, which are journaled in sheave bearings 81, extend somewhat beyond the sides of the sheave, the latter being so sized within the alley as to leave some lateral clearance between the sheave and the walls of the alley.

Provision is made in the feed reel mechanism of the present invention for preventing undue sag of the conduits, and excessive slack therein, by the use of a plurality of guide roller assemblies 82 arranged in tandem with each sheave 72, 73 and spaced laterally therefrom. Upon reference to Figs. 5 and 13, it is seen that each sheave 72, 73, is provided with a pair of arms or links 84 spaced on either side thereof, one end of each link being journaled on the laterally extending ends 80 of the sheave axle 76. The opposite ends of the links 84 are journaled on a pulley shaft 86 so as to connect the sheave with a pulley 88. Rigidly formed with the ends of each of the links 84 journaled on the sheave axle 76 are upstanding lugs 89 which are centrally apertured transversely to the axle for receiving the ends of elongated rods 90, the latter being held therein by set screws 91. As may be observed from Figs. 9 and 13, the elongated rods 90 extend forwardly of each sheave along a portion of the alley 69, being supported at their other ends and intermediate their ends by the transverse roller assemblies 82.

As indicated above, the roller assemblies 82 are spaced laterally along the portion of the alley 69 immediately forward of each sheave and serve to support the conduits 44 from sag and strain. Upon particular reference to Fig. 13 it will be observed that each roller assembly 82 comprises a roller 94 of wood or the like rotatable about a metal roller axle 95. The axle 95 is journaled in suitable bearing lugs 96 spaced along the elongated rods 90 and secured thereto by means of set screws 98. For the purpose of supporting the roller assembly 82 over the alleyway, the ends of the axle 95 extend through flanged wheels 99 which ride along the shoulder 40 formed on the channel beams 38 and 66, 68. The wheels 99 are held on the ends of the roller axle 95 as by means of suitable machine screws 100. In this way each of the roller assemblies 82 is tied together with a corresponding one of the sheaves 72, 73 to form a rigid supporting frame. The frame is subjected to translatory movement along the alley 69 as its associated sheave follows the translatory movement of its corresponding saddle.

Figure 15:
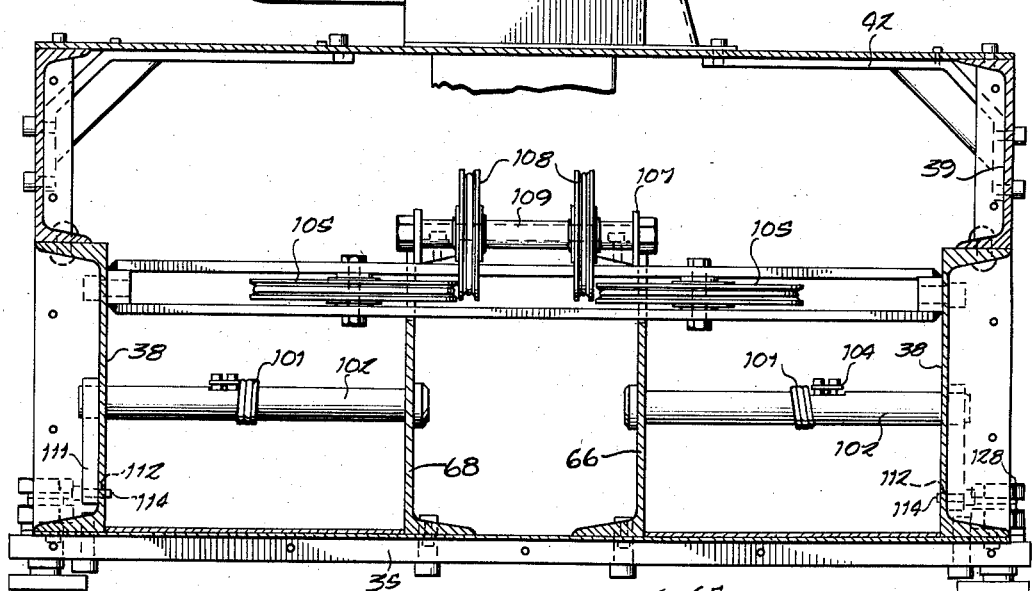
Fig. 15 is an enlarged fragmentary vertical sectional view taken transversely through the mechanism along the line 15—15 in Fig. 7 and showing certain details of the tensioning arrangement.

For the purpose of tensioning the feed reels and the conduits carried thereon, a tensioning arrangement is employed which is somewhat similar to that disclosed in U.S. Patent No. 2,395,485 issued February 26, 1946, on the application of Gordon H. Jones. The tensioning arrangement employed herein continuously urges each sheave against the pull of the conduits 44 through a cable and pulley arrangement which is effective to roll the sheave back along its alley in the return movement of the carriage. As viewed in Fig. 6, a flexible cable 101 is provided in each alleyway and for each sheave for this purpose. Each cable 101 is anchored at one end to a cylindrical end bar 102, which bar is rigidly disposed transversely across that end of the alleyway in which the corresponding sheave moves. The cable 101 is wrapped around the bar 102 and is there held fast by a suitable cable clamp 104. From the end bar 102, the cable 101 is carried forwardly over the pulley 88 which is operatively coupled with one of the sheaves 72, 73, by means of the links 84. The cable is then led back to the extreme end portion of the alley and around a transversely disposed pulley 105 which is rotatable about a shaft journaled in and sandwiched between spaced upper and lower framing bars 106, which bars extend transversely of the compartment 31 and are, in this instance, welded to the front and back supporting channel beams 38. Attention is drawn to the lateral positioning of the pulleys 105, which is shown in Fig. 15, so that the cable 101, after being led around the respective pulley 105, is then passed longitudinally along the middle passage 71 and thence over a vertically disposed pulley 108 which is journaled at the other end of the middle passage 71 on a transverse axle 109 traversing the passage 71 and rigidly fastened to the dividing members 66 and 68, respectively, by means of extension plates 107 and castle nuts and cotter pins. It will be observed that a second pulley identical to pulley 108 is journaled in parallel relationship on the axle 109, this second pulley being spaced from the first for servicing the feed reel mechanism contained in the rear alley 70. After passing over the pulley 108 the cable 101 is then led back to its respective saddle 22 or 24, where it is affixed by means of a turnbuckle 110 to the open top of the tray 60 opposite the bracket 55 hereinbefore described.

In order to initially tension the cable 101, a manually adjustable cranking arm 111 is mounted on one end of the bar 102, which bar extends through and slightly beyond the beam 38. A plurality of holes 112 are drilled in a semi-circular pattern in the beam 38 adjacent the bar 102 so that a suitable stop pin 114 may be inserted therein to maintain the crank 111 in a predetermined position for properly tensioning the cable. In this way the tension on the cable 101 and the corresponding tension applied to the conduits 44 is adjustably determined by the setting of the crank 111 and once this tension has been set, it remains uniform irrespective of the position of the respective saddle 22 or 24 upon the machine bed 20.

From Figs. 9 and 16 it will be observed that several sets of cable roller assemblies 115 and 115a are mounted respectively, on top of and between the dividing members 66 and 68 for supporting the various lengths of the tensioning cable 101 extending between the tray 60 and the sheave 72. By reason of this arrangement, the various sections of the cable 101 are kept free from tangling. Each cable roller assembly 115 includes a metal bracket 116 which spans the channel beams 66, 68, and is suitably secured to the upper flanges of the beams, and a pair of cable rollers 118 journaled on an axle 119 stationary with the bracket. Similarly, the assembly 115a comprises a pair of cable rollers 118a journaled on an axle 119a which is secured between the members 66, 68.

It is thus seen that when the saddle 22, for example, moves away from its end of the bed 20 the conduits 44 leading to the saddle 22, pull the sheave 72 along in the same direction and the cable is paid out to the left end of the saddle (Fig. 3) so as not to impede the movement of the sheave. When the saddle 22 makes its return movement, the operation is reversed and the cable 101, acting through the pulley 88 and the link 84, serves to pull the sheave 72 along in the direction of saddle movement while the conduits are maintained in taut condition due to the tension exerted upon the conduits by the sheave 72 as a result of the action of the tensioning arrangement.

Since the units comprising the sheaves 72 or 73, the pulleys 88 and the linking bars 84 continually move longitudinally along the alleyways it is feasible to provide antifrictional guide rollers to prevent any dragging of these units against the sides of the alleys. Accordingly, a guide roller assembly 120, as shown in Fig. 14, is mounted in each of the links 84 and faces outwardly for rolling engagement with the channel beams 38, 66 and 68. The assembly 120 comprises a transverse disc shaped metal roller 121 rotatable about a pin 122 which is vertically secured in a suitable mounting block 124. The mounting block 124 fits through a transverse opening 125 in each link 84 and is held therein by means of a set screw 126.

For the purpose of adjusting the compartment 31 horizontally and thereby maintaining the alleyways level, a series of leveling jacks 128 is provided along the lower edges of the housing 30. Upon actual installation of the machine, however, the leveled housing would also be supported by the use of grouting in a manner well known in the art.

In accordance with another aspect of the invention, a novel stop mechanism is associated with the translatable saddles to prevent further movement of the saddles toward each other upon the attainment of a predetermined degree of proximity. As indicated in Figs. 1, 2 and 17, the stop mechanism comprises an arm 129 mounted on the saddle 22 and extending therefrom longitudinally of the machine bed 20 in the direction of the saddle 24. The mechanism also includes a similarly situated arm 130 mounted on the saddle 24 and extending longitudinally of the machine bed 20 toward the saddle 22. Electric limit switches 131, 132 are fixed respectively to corresponding ones of the saddles 22, 24. These parts are so alined that the arm 129 of the saddle 22 is adapted to actuate the limit switch 132 of the saddle 24. By the same token, the arm 130 of the saddle 24 is adapted to actuate the limit switch 131 of the saddle 22. In the present instance, the foregoing is conveniently accomplished by constructing the arms in tubular form so that the arm 130 telescopes within the arm 129. Accordingly, when the saddles approach a proximity predetermined by the length of the arms, the end of the arm 129 trips a lever 134 pivoted on a bracket 135 which is fixed to the saddle 24. The lever 134 in turn trips its associated limit switch 131 which is connected inside the saddle 24 to cut off the power supply for the motor which translates that saddle. Similarly, a lever 136 pivotally mounted on its associated bracket 135 extends through an opening 138 in the arm 129 so that this lever is operable by the end of the smaller arm 130. Tripping the lever 136 then cuts off the power supply for the motor which translates the saddle 22 by means of the limit switch 132.

Thus it is seen that the stop mechanism enables the saddles to travel freely a common path extending almost the entire length of the machine bed. In addition, this mechanism insures free and unobstructed movement of the feed reels 72, 73 over the same longitudinal path within their single alley 69.

Attention is drawn to the fact that the sheave 73 associated with the saddle 24, and having a separate tensioning arrangement identical to that described earlier herein operates in the same manner as that set forth in connection with the sheave 72 and the saddle 22. It is noted that anchoring the conduits 44 intermediate the ends of the housing 30 enables each of the sheaves 72, 73 to undergo translatory movement after the manner of a two-strand pulley. The practical result of this arrangement is that for a given longitudinal displacement of a saddle, its associated sheave traverses just half of the distance traversed by the saddle. Thus, referring again to Fig. 3, movement of the saddle 22 from the extreme left end of the bed to a position adjacent the right end of the bed, that is, adjacent to the saddle 24, will result in a translation of the sheave 72 from a position near the extreme left end of the compartment 31 to only the central portion of such compartment. By taking advantage of this effect, and by utilizing the stop mechanism described earlier herein, there has been provided a novel feed reel mechanism wherein two separate feed reel devices are disposed in the same alleyway for presenting service conduits to two corresponding machine saddles, each saddle being translatable along substantially the entire length of the machine bed, without any interference between such feed reel devices.

We claim as our invention:

1. In a machine tool having a pair of alined saddles independently translatable along overlapping paths provided by an elongated horizontal bed, a service feed mechanism for said saddles, said mechanism comprising, in combination, a housing defining a single alley extending longitudinally of said bed substantially parallel to and coextensive with the path of movement of said saddles, a junction box disposed intermediate and separating the opposite ends of said alley, a conduit take-up mechanism including a sheave disposed in each of said opposite ends of said alley and associated respectively with one of said saddles, said sheave being movable in the respective end of the alley while the associated saddle travels the full length of its path of movement, a flexible conduit extending from said junction box into each of said opposite ends of said alley running over the sheave disposed therein and being connected to the associated saddle, each of said take-up mechanisms including a flexible cable anchored at its ends to the associated saddle and to said housing respectively and running over a pulley connected to said sheave, said flexible cable also being trained about a fixed pulley in the end of said alley remote from said latter sheave whereby to move the sheave along with the associated saddle in the respective end of the alley as the latter saddle changes position to maintain the conduit taut in all positions of said saddle.

2. In a machine tool having a support and a pair of alined saddles independently translatable on said support, a service feed mechanism, said mechanism comprising in combination, a housing defining a single alley extending substantially parallel to and coextensive with the path of movement of said saddle, a conduit take-up mechanism disposed in each of the opposite ends of said alley and associated respectively with one of said saddles, said take-up mechanisms being movable in the respective ends of said alley while the associated saddle travels the full length of its path of movement, a flexible conduit extending from a point intermediate said opposite ends of said alley via each of said take-up mechanisms to the saddle associated therewith and means acting on each of said take-up mechanisms to maintain said conduit taut in all positions of the associated saddle.

3. In a machine tool having a support and a plurality of alined saddles translatable along overlapping paths provided by said support, a doubled up feed reel mechanism, said mechanism comprising, in combination, a housing defining an alley extending longitudinally of the support and substantially co-extensive therewith, a plurality of free sheaves associated respectively with said saddles and disposed in alinement in said alley, said sheaves being translatable along the opposite ends of said alley while the associated saddle travels the full length of its path of movement, flexible conduits running over each of said sheaves, said conduits being anchored at a point intermediate said opposite ends of said alley and extending to the saddle associated with the respective sheave, each of said sheaves having a plurality of rollers arranged in tandem and for movement therewith for supporting said conduits to prevent undue sagging thereof, said conduits acting to roll each sheave along the alley with the associated saddle in response to movement of said latter saddle in one direction, and means operative to maintain said conduits taut irrespective of the position of said saddles on the support.

4. In a machine tool having an elongated horizontal bed and a plurality of alined saddles translatable along common overlapping paths provided by said bed; a doubled up feed reel mechanism, said mechanism comprising, in combination, a housing with walls defining an alley extending longitudinally of the bed and substantially co-extensive therewith, a plurality of free sheaves associated respectively with said saddles and disposed in alinement in opposite ends of said alley, said sheaves being translatable along the respective ends of said alley while the associated saddle travels the full length of its path of movement; a flexible conduit running over each of said sheaves having one end anchored intermediate the said opposite ends of said alley for connection to a power source, and having the other end connected to the saddle associated with the respective sheave; means associated with each of said sheaves for supporting a long bight of said conduit, said means comprising a pair of spaced, parallel rods secured at one end to said sheave and a plurality of roller assemblies rigidly traversing said rods and arranged in tandom with said sheave, said roller assemblies being movably mounted along said housing walls; said conduits acting to move each sheave along with the associated saddle in response to movement of said latter saddle in one direction; and means operative to maintain said conduit taut irrespective of the position of the saddles on the bed.

5. In a machine tool having a pair of alined saddles independently translatable along overlapping paths provided by a support, a doubled up service feed mechanism, said mechanism comprising, in combination, a housing defining a single alley extending longitudinally of said support and substantially co-extensive therewith, anchoring means disposed intermediate and separating the opposite ends of said alley, a flexible conduit extending into each of said opposite ends of said alley from said anchoring means to each of said saddles, a conduit take-up mechanism disposed in each of said opposite ends of said alley and associated, respectively, with one of said saddles, each of said take-up mechanisms being mounted in and movable along the respective end of said alley for taking up the slack in the conduit connected to the associated saddle as the latter travels the full length of its path of movement along said support, means acting on each of said take-up mechanisms to maintain said conduit taut in all positions of the saddles, and stop means associated with each of said saddles for cutting off translatory movement of said saddles toward each other upon attainment of a predetermined degree of proximity thereby precluding entanglement of said take-up mechanisms.

6. In a machine tool having a pair of alined saddles independently translatable along common overlapping paths provided by a bed; a doubled up feed reel mechanism, said mechanism comprising, in combination, a housing defining a single alley extending longitudinally of said bed and substantially co-extensive therewith; a junction box disposed intermediate and separating the opposite ends of said alley; a flexible conduit extending from said junction box into each of said opposite ends of said alley and connecting said junction box to one of said saddles; a conduit take-up mechanism disposed in each of said opposite ends of said alley and associated respectively with one of said saddles, each of said take-up mechanisms being mounted in and movable along the respective end of said alley for taking up the slack in the conduit connected to the associated saddle as the latter travels the full length of its path of movement along said bed; means acting on each of said take-up mechanisms to maintain said conduit taut in all positions of the saddles, said means including a flexible cable operatively connected to one of said take-up mechanisms and having one end anchored to the saddle associated therewith and the other end anchored to said housing, said flexible cable also being trained about a fixed pulley in the end of said alley remote from said latter take-up mechanism, whereby to move said take-up mechanism along with the respective saddle as the latter changes position; and stop means associated with each of said saddles for cutting off translatory movement of said saddles toward each other upon the attainment of a predetermined degree of proximity thereby precluding entanglement of said take-up mechanisms, said stop means including a projecting arm secured to each of said saddles, said arms being oppositely arranged with respect to each other and operatively associated for cooperation with each other, switches associated with said arms for actuation during said cooperation thereby cutting off translatory power to said saddles, and levers arranged to actuate said switches upon engagement therewith by the outer ends of the arms.

7. In a machine tool having a pair of alined saddles independently translatable along overlapping paths provided by an elongated horizontal bed, a doubled up service feed mechanism for said saddles, said mechanism comprising, in combination, a housing defining an alley extending longitudinally of said bed and substantially co-extensive therewith, a flexible conduit extending from a point intermediate the opposite ends of said alley into each of said opposite ends of said alley and to one of said saddles, a pair of conduit take-up mechanisms disposed in alinement in said alley, one of said take-up mechanisms being disposed in each of said opposite ends of said alley and being associated respectively with one of said saddles and the conduit connected thereto, said take-up mechanisms being arranged so as to move along the respective end of said alley while the associated saddle travels the full length of its path of movement on the bed, and means acting on each of said take-up mechanisms for maintaining said conduits taut in all positions of said saddles.

References Cited in the file of this patent

UNITED STATES PATENTS

| | | |
|---|---|---|
| 1,689,695 | Strombach | Oct. 30, 1928 |
| 1,866,681 | Taylor | July 12, 1932 |
| 2,201,954 | Flygare | May 21, 1940 |
| 2,395,485 | Jones | Feb. 26, 1946 |
| 2,434,751 | Trecker et al. | Jan. 20, 1948 |
| 2,725,431 | Rushworth | Nov. 29, 1955 |

FOREIGN PATENTS

| | | |
|---|---|---|
| 1,065,551 | France | Jan. 13, 1954 |